United States Patent [19]

Elstone, III

[11] Patent Number: 4,981,080
[45] Date of Patent: Jan. 1, 1991

[54] PUMP TRANSPORT DEVICE

[76] Inventor: John M. Elstone, III, 662 Delaware Ave., Roebling, N.J. 08554

[21] Appl. No.: 300,085

[22] Filed: Jan. 23, 1989

[51] Int. Cl.$^5$ .................. B61B 31/10; E02B 1/00; B09B 1/00; F04B 21/00
[52] U.S. Cl. ......................... 104/138.2; 210/170; 405/128; 417/234
[58] Field of Search .............. 405/53, 128, 184, 129; 210/170; 417/234; 104/138.2, 168; 378/60

[56] References Cited

U.S. PATENT DOCUMENTS

| 3,505,820 | 4/1970 | Draper et al. | 405/53 |
|---|---|---|---|
| 3,669,026 | 6/1972 | Mouritzen | 104/118 |
| 4,119,210 | 10/1978 | Desourdy | 214/1 |
| 4,130,925 | 12/1978 | Gibson | 29/407 |
| 4,177,734 | 12/1979 | Rhoden | 104/138.2 |
| 4,209,269 | 6/1980 | Martinez | 405/154 |
| 4,284,385 | 8/1981 | Lively et al. | 414/747 |
| 4,363,594 | 12/1982 | Morin | 414/747 |
| 4,439,062 | 3/1984 | Kingsbury | 405/129 |
| 4,594,027 | 6/1986 | Becker | 405/154 |
| 4,624,604 | 11/1986 | Wagner et al. | 405/128 |
| 4,635,559 | 1/1987 | Nelson | 104/119 |

FOREIGN PATENT DOCUMENTS 0105839  6/1983  Japan ................. 104/138.2

Primary Examiner—Robert J. Oberleitner
Attorney, Agent, or Firm—Thomas A. Lennox

[57] ABSTRACT

To remove leachate collection in a drainfield under a landfill site with an inclined pipe conduit connected to a main leachate collection conduit pipe, the access pipe opening to the surface with a discharge flexible hose with a submersible pump on the end in carriage device including a housing attached around the submersible pump with two pairs of wheels freely and rotatably attached to the housing with the wheels angled outwardly and rotating in planes which intersect on a line parallel to the longitudinal center line of the housing, the line being above the housing and proximate the center line of the pipe conduit.

26 Claims, 4 Drawing Sheets

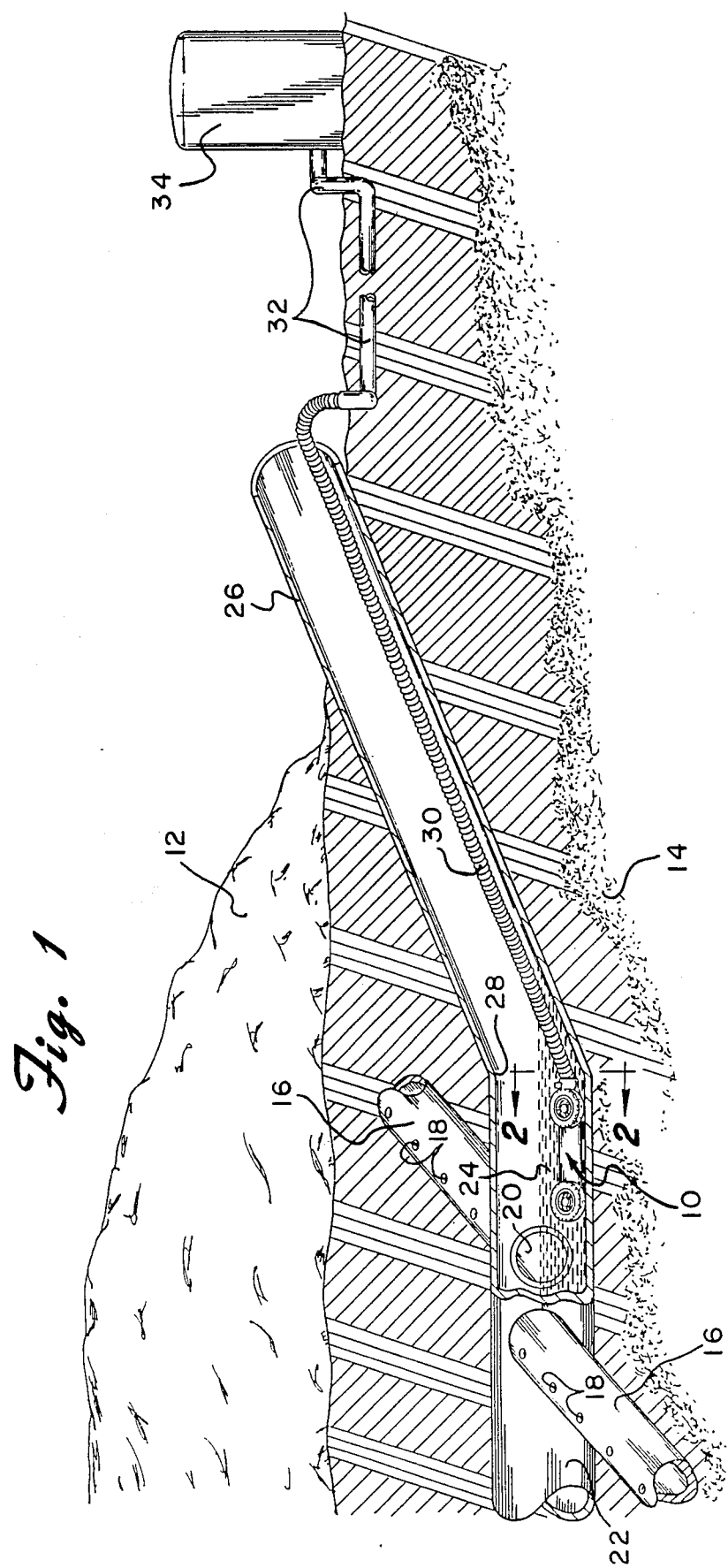

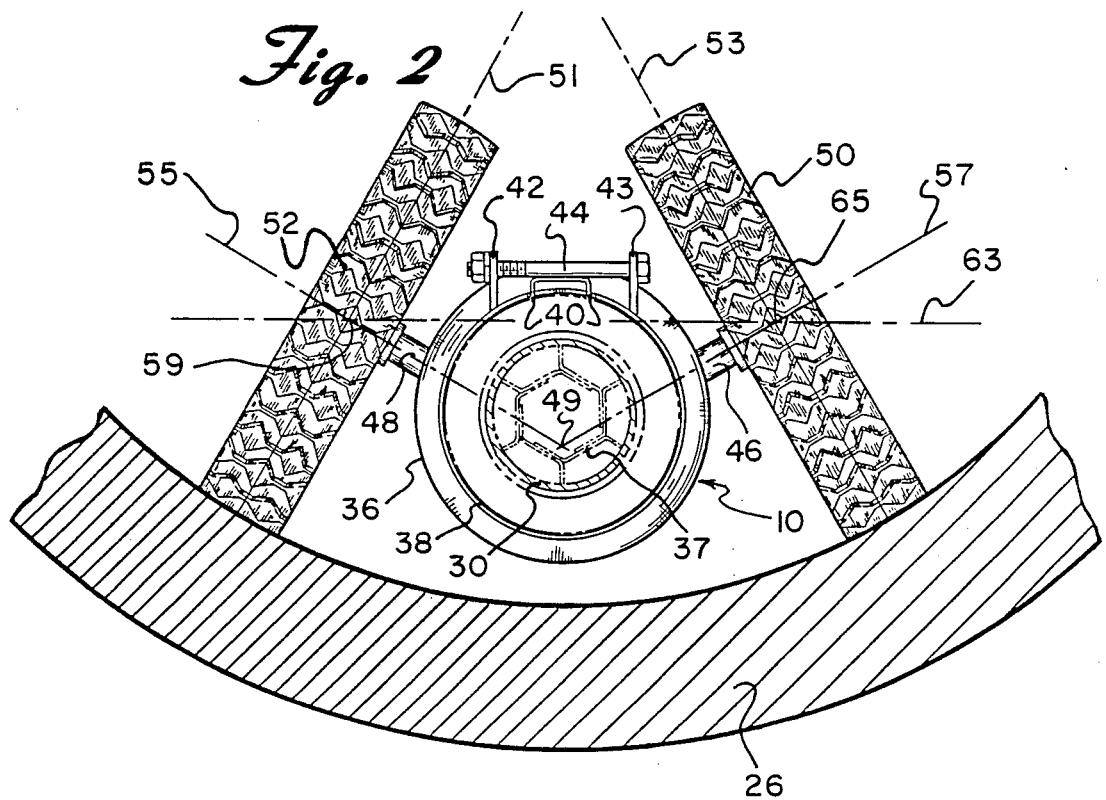
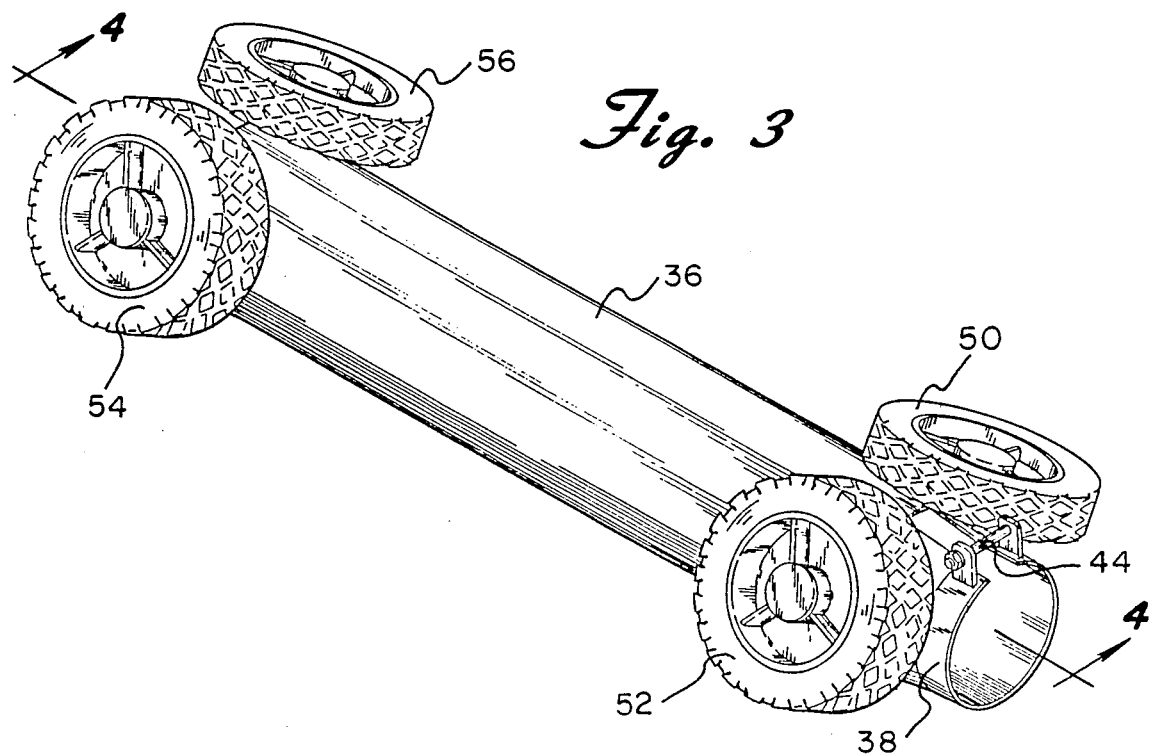

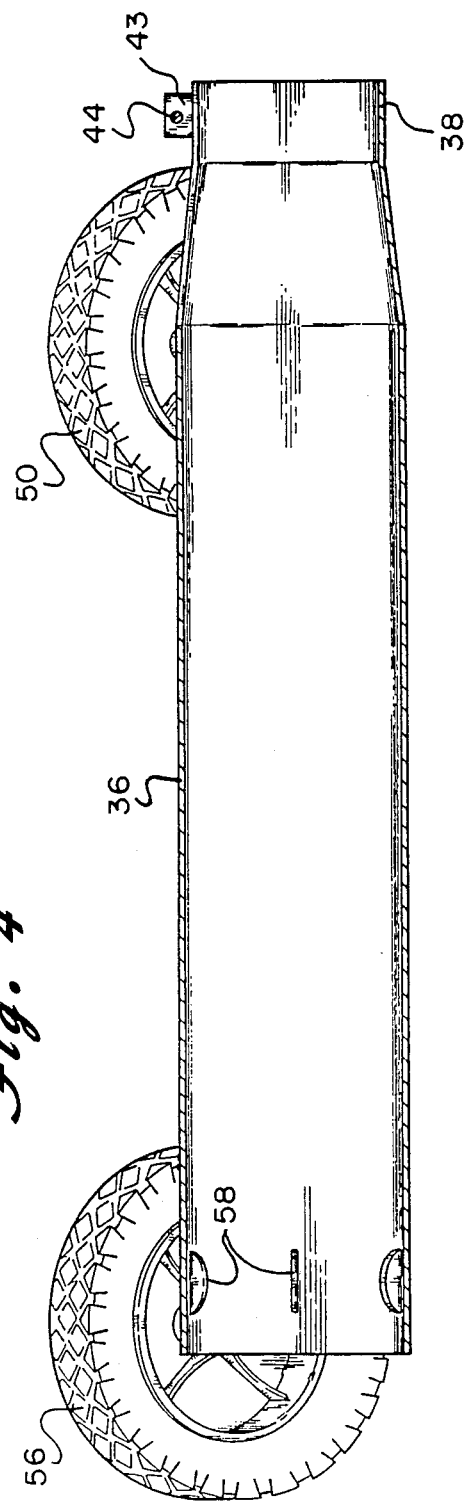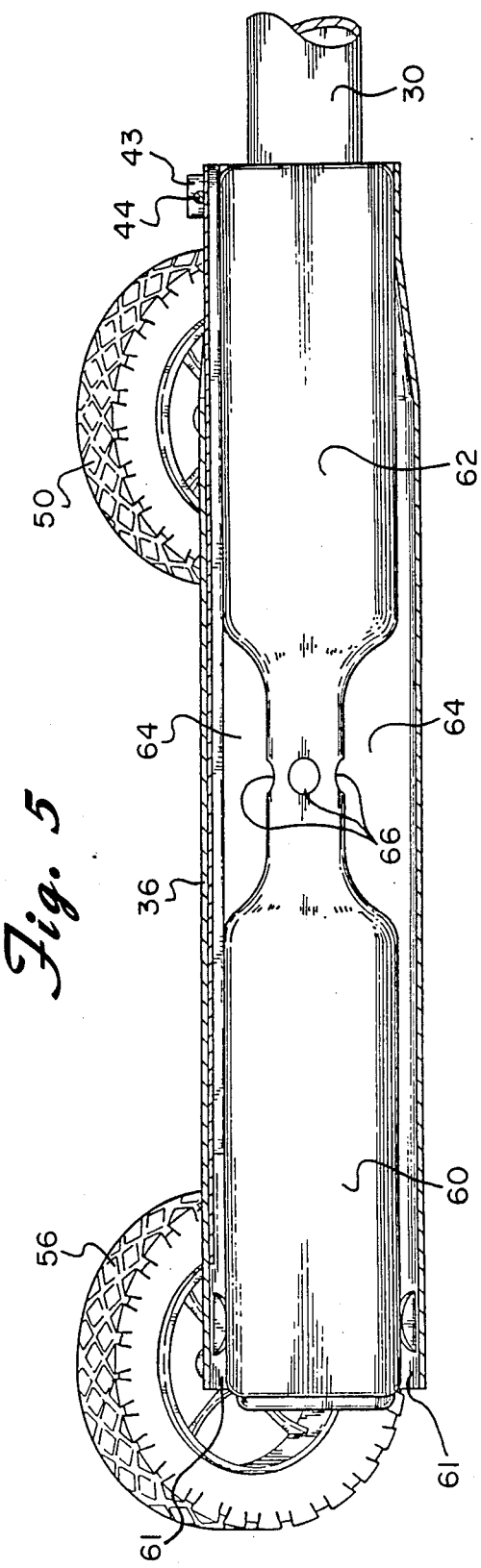

PUMP TRANSPORT DEVICE

BACKGROUND OF THE INVENTION

This invention involves a pump transport device and more particularly, a wheel device on which a pump rides.

One of the major concerns with the landfill method of waste management is the possible contamination of ground water. Unless precautions are made, water seeping down through the porous landfill picks up various contaminants and trickles down to the ground water system below, contaminating the ground water and posing a serious health hazards. It is now required that landfills be placed over a leaching field including a field of perforated angled pipes to collect the leachate seeping down through the landfill from above. The drainfield feeds into a leachate pipe, generally about twenty-four inches in diameter extending a substantial length under the landfill. This leachate pipe is connected to an angled access pipe generally about the same diameter as the horizontal leachate pipe. The access pipe is angled at about twenty to twenty-five degrees and extends upwardly to open at the surface. The necessary distance for this access pipe to reach the surface is usually about seventy-five feet in length. As the liquid level rises in the leachate pipe, it must be pumped out to a holding tank for proper disposal. A flexible hose, generally about two and a half inches in diameter connected on its end to a submersible pump is pushed down the access pipe until the submersible pump is under the water level of the collecting leachate. Unfortunately, it is virtually impossible to push the flexible hose, with the cylindrical pump on the end, down the access pipe as it tends to hang up on various projections or get tangled during the descent.

None of the prior art devices have satisfied this problem nor attain the objects described hereinbelow.

SUMMARY OF THE INVENTION

Attempts to attach wheels to the pump and hose end fail to achieve satisfactory results. Regardless of the size of the wheels, the pump and hose end tend to hang up, ride up on the sides of the access pipe during the descent and become twisted together with additional problems.

It is an object of the present invention to provide a carriage device to allow easy and troublefree descent of a submersible pump attached on the end of a flexible hose.

It is a specific object of the present invention to provide a carriage device to carry a submersible pump down an inclined circular pipe constructed so as to resist turning over and also resist riding up the inside surface of the inclined pipe.

This is a further object of the present invention to provide a carriage device to carry a pump up and down and the inside of an inclined circular pipe with wheels that do not bind either as a result of climbing too high on the wall or towing inwardly to bind against the sides of the pipe.

The invention is a pump transport device to facilitate movement of a submersible pump attached to a flexible hose, the movement being along the inside of a large diameter pipe having a lengthwise axis of symmetry. The device includes means to interfit over the submersible pump, the means including a sleeve with a height, two opposite sides and a center gravity. The device further includes attachment means to detachably attach the submersible pump inside the sleeve and two pairs of axles, each pair spaced apart toward opposite ends of the shroud means, and each axle of each pair having an axis of rotation and is being attached and angled upwardly on opposite sides of the sleeve. The device further includes four wheels, one attached on each axle to rotate on the axis of rotation, the wheels being a diameter greater that the height of the shroud means. The wheels on the same side of the shroud means rotate in single planes, and the combination of the diameter of the wheels, the length of the axles, and the angle upwardly of the axles place the center of gravity of the shroud means at a height below a line drawn between points of intersection between the axes of rotation of a pair of axles and the planes of rotation of the wheels.

It is preferred that the wheels on the same side of the jacket rotate in single planes intersecting at a level proximate the lengthwise axis of symmetry of the large diameter pipe, and that the single planes be sloped at angles within fifteen degrees, more preferably ten degrees, of a radial direction of the large diameter pipe, from a contact point of the wheels against an inside wall of the large diameter pipe.

It is most preferred that the wheels on the same side of the jacket rotate in single planes that proximate a radial direction of the large diameter pipe. It is also preferred that the submersible pump include a cylindrical body and the jacket member is a single cylindrical sleeve, and more preferred that the pump includes a pair of cylindrical bodies housing a pump and a motor and the jacket member is a cylindrical sleeve of sufficient size to allow the cylindrical bodies to interfit into the sleeve in a front to rear relationship. It is also preferred that the attachment means include a metal strap attached to the shroud means and a bolt means to reduce the diameter of the strap to grip the submersible pump. It is preferred that the diameter of the wheels be about 10 to about 75 percent larger that the height of the shroud means, and more preferred that the diameter of the wheels be about 20 to about 65 percent larger. It is further preferred that the axes of rotation of a pair of the axles extend downwardly intersect at point below the center of gravity of the shroud means.

It is preferred that the combination of the size of the wheels, the length of the axles, and the angle of the axles place the combined center of gravity of the pump and the device at a height below a line drawn between points of intersection between the axes of rotation of the axles and the planes of rotation of the wheels.

BRIEF DESCRIPTION OF THE DRAWINGS

FIG. 1 is a partial cut away elevational view of a leaching field with a leachate pipe coupled to an access pipe into which a pump transport device of the present invention is used to utilized to transport a pump attached to a flexible pipe down into the leachate pipe.

FIG. 2 is a cross-sectional view taken along lines 2—2 of FIG. 1.

FIG. 3 is a perspective view illustrating a pump transport device of the present invention.

FIG. 4 is a cross-sectional view taken along lines 4—4 of FIG. 3.

FIG. 5 is a vertical cut-away view of the device illustrated in FIG. 3 exposing the pump and motor housing.

DESCRIPTION OF PREFERRED EMBODIMENTS

Figure 6:
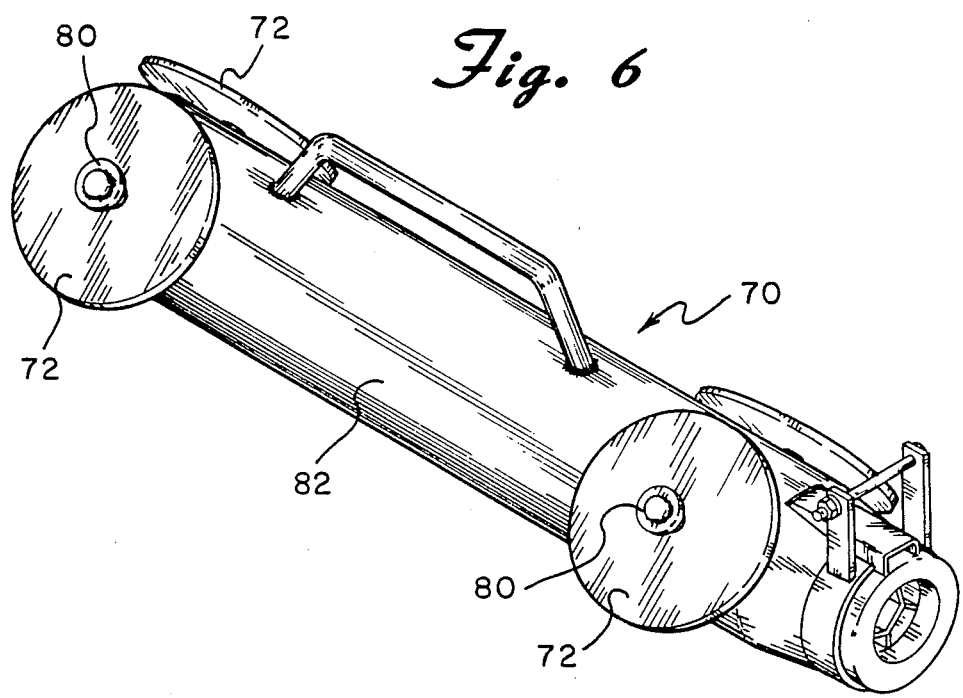
FIG. 6 is a perspective view illustrating a second pump transport device of the present invention.

In FIG. 1, landfill 12 has been placed over water source ground 14 which in most state laws must be protected from dangerous materials that leach out of the landfill through water seeping downwardly. Leach field pipes 16 cross under the entire length and breadth of landfill 14 to collect leachate through seepage holes 18. The leachate flows along inclined field pipes 16 to openings 20 through which the leachate flows into horizontal leachate pipe 22. Leachate 24 collects and finally rises to a level which is removed by a pump held in device 10 which is connected to flexible pipe 30 running upwardly along angled access pipe 26 which opens at an access level above ground. Removal pipe system 32 is connected to flexible pipe 30 to provide a flow system directly to storage tank 34 in which the leachate is collected and stored until removal to a treatment center.

FIG. 2 is a cross-sectional view cutting through pipe 30 exposing pump discharge 37 inside the pump housing which is held and supported inside shroud 36 which is secured by strap 38 with opening 40 allowing the strap diameter to be closed tightly against the pump with bolt and nut combination 44 through vertical uprights 42 and 43 welded directly to strap 38. Axles 46 and 48 which are identical to a hidden pair of axles at the opposite end of shroud 36 are angled upwardly at about 30 degrees. The axis of rotation on which wheels 50 and 52 rotate at the end of axles 46 and 48, if extended downwardly, would intersect at a point below the center of gravity which is the geometric center of the pump and shroud combination. Axles 46 and 48 are not angled and attached to shroud 36 in such a fashion that the axes of rotation of the axles necessarily intersect at the longitudinal center line of shroud 36. In this embodiment, the axes of rotation are angled at about 60 degrees from the vertical and intersect at a point 49 about ½ inch below the longitudinal center line of shroud 36. If these axes of rotation are extended upwardly to intersect the planes of rotation of wheels 50 and 52, two points on those planes are located. A line between those two points defines a height above the center of gravity, or in this case, the longitudinal center line of the pump and shroud combination. If the axes of wheel rotation were angled at 55 degrees or at 75 degrees from the vertical, the wheels would ride at too canted an angle from a perpendicular relationship with an asymtope to the interior surface of pipe 26. The wheel diameters are about seven inches while the outside diameter of the shroud is about 4 ¼ inches. The diameter of the wheels is about 65 percent greater than that of the shroud. With the axle length of about one inch, the bottom of shroud 36 rides about ½ to one inch above the inside surface of pipe 26 which is about 19 ¼ inches inside diameter. For smaller sized pipes, such as an eight inch inside diameter pipe, a 3 ½ inch out diameter shroud and wheels of about 4 ¼ inches in diameter is effective. However, in order to avoid the wheels binding up on the edges of the pipe and to reduce the ease of travel, narrow wheels of ⅛ inch thick stainless steel are utilized to provide as little drag as possible with axles about ½ inch long. In this configuration, the intersection of extensions of the axes of rotation of the wheels intersect about ⅞ inch below the center of gravity of the pump and shroud combination. The axes of rotation are about 45 degrees from vertical. In order to provide sufficient room under the shroud and to prevent the wheels from touching at the top and to avoid catching any wires attached to the pump between the tops of the wheels, the diameter of the wheels is preferred to be in the range of about 10% to 75% greater than the height of the shroud and more preferred to be in the range of 10% to 65% greater than the height of the shroud. Wheels 50 and 52 as well as pair of wheels 54 and 56 illustrated in FIG. 3 rotate in planes. Wheels 52 and 56 on one side rotate in a single plane as do wheels 50 and 54. These planes intersect at a line close to the lengthwise axis of symmetry of pipe 26. To state it another way, these planes of rotation approach that of the radial lines of pipe 26. Axes of rotation 55 and 57 of axles 48 and 46 respectively intersect planes 51 and 53 at points 59 and 61, respectively. Line 63 connecting points 59 and 61 is above the center of gravity of device 10. In this configuration, the wheels are resting on the inside surface of pipe 26 at as close to a perpendicular position as is possible. These angles may vary somewhat and for some size pipes, it is not quite possible to achieve exact radial rotation. For most applications, it is satisfactory for the wheels to rotate up to about 15 degrees away from the radial position to the inside surface. For instance, in the example described above for the 8 inch inside diameter pipe, the 4 ¼ inch wheels are angled a little more than 10 degrees away from the radial angle. It is preferred that the wheels be no further than about 10 degrees from the radial angle. As illustrated in FIG. 4, shroud 36 includes a cylindrical sleeve with projections 58 extending from the interior of the sleeve to abut and hold the submersible pump mechanism in the center of the sleeve. In FIG. 5, housing 60 of the motor portion of the pump is positioned frontwardly of sleeve 36 with the housing necking down in the center to provide space 64. When submersed, water flows past inside surface 65 of sleeve 36 around housing 60 through space 64 on the inside of shroud 36 cooling the motor and entering chamber 64 which is directly assessable to water inlets 66 to the pump located inside of pump housing 62. In this fashion, motor 60 is cooled by the flowing water and facilitates its performance.

Figure 7:
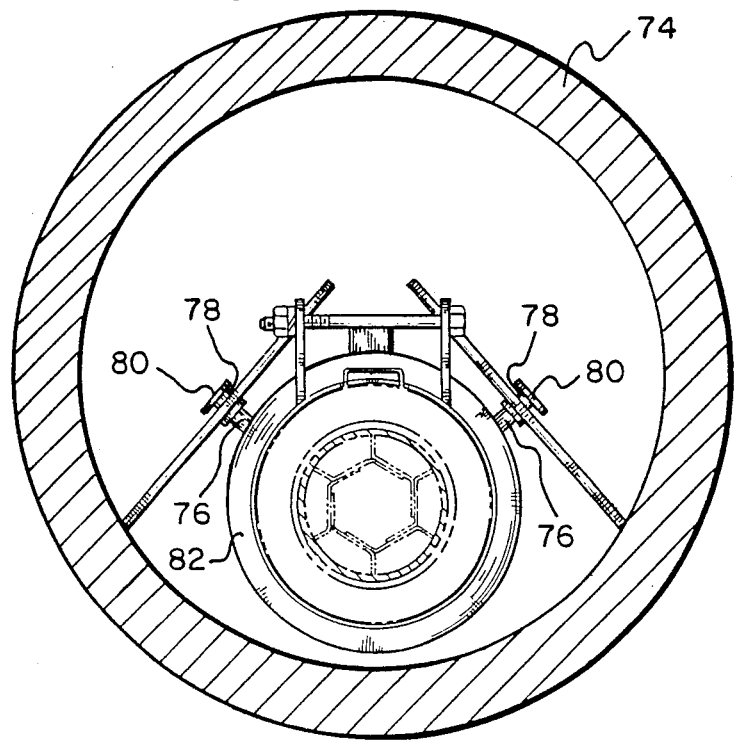
FIG. 7 is a cut-away of a smaller diameter access pipe with an elevational view similar to that of FIG. 2 of the device illustrated in FIG. 6.

FIG. 6 shows a second embodiment device 70 with ⅛ inch thick stainless steel wheels 72, which have a diameter of about four and one-quarter inches. FIG. 7 illustrates device 70 shown in FIG. 6 inside a smaller nine inch inside diameter access pipe showing the stainless steel wheels rotating on short axles 76 welded to shroud 82 with sufficient play between the size of the holes through the wheels and the size of the pulley-type shape 78 on the axles allowing the wheels to find the radial direction of the larger diameter access pipes or other free rolling angles depending on the diameter of the pipe. For this very small diameter access pipe the planes of wheel rotation are at about the limit of 14 to 17 degrees from the radial direction of the access pipe. The wheels are held on the axle by welding the round disc shape 80 on the end of the axle allowing the wheel to rotate in the channel of the pulley-type shape 78. With the play between the wheel axle hole and the diameter of the axle, wheels of a single pair may vary as to their plane of rotation from each other up to about five degrees from the radial direction. Thus, with the play, one wheel might rotate in a plane angled about eleven degrees from the radial direction of a very small diameter access pipe, while the wheel on the opposite side of the shroud may rotate in a plane angled about sixteen degrees from the radial direction of the pipe. With larger diameter pipes both wheels will approach rotating planes close to the radial direction.

While this invention has been described with reference to the specific embodiments disclosed herein, it is not confined to the details set forth and the patent is intended to include modifications and changes which may come within and extend from the following claims.

I claim:

1. A transport device to facilitate movement of an apparatus along the inside of a large diameter pipe having a lengthwise axis of symmetry, the device comprising:
    (a) a shroud means comprising a sleeve to interfit over the apparatus, with a height, two opposite sides, and a center of gravity,
    (b) attachment means to detachably attach the apparatus inside the sleeve,
    (c) two pairs of axles, each pair spaced apart toward opposite ends of the shroud means, and each axle having an axis of rotation angled upwardly on opposite sides of the sleeve, and
    (d) four wheels, one attached on each axle to rotate on the axis of rotation, the wheels being a diameter greater than the height of the shroud means,
    wherein the wheels on the same side of the shroud means rotate in single planes, and
    wherein the combination of the diameter of the wheels, the length of the axles, and the angle upwardly of the axles place the center of gravity of the shroud means at a height below a line drawn between points of intersection between the axes of rotation of a pair of the wheels and the planes of rotation of the wheels.

2. The device of claim 1 wherein wherein the apparatus is submersible pump attached to a hose.

3. The device of claim 2 wherein the apparatus comprises a cylindrical housing and the shroud means is a cylindrical sleeve of sufficient size to allow the housing to interfit into the sleeve with space remaining between the sleeve and the housing.

4. The device of claim 1 wherein wherein the wheels on the same side of the shroud means rotate in single planes intersecting at a level proximate the lengthwise axis of symmetry of the large diameter pipe.

5. The device of claim 4 wherein the single planes are sloped at angles within fifteen degrees of a radial direction of the large diameter pipe, from a contact point of the wheels against an inside wall of the large diameter pipe.

6. The device of claim 4 wherein the single planes are sloped at angles within ten degrees of a radial direction of the large diameter pipe, from a contact point of the wheels against an inside wall of the large diameter pipe.

7. The device of claim 1 wherein wherein the wheels on the same side of the sleeve rotate in single planes that proximate a radial direction of the large diameter pipe.

8. The device of claim 1 wherein the submersible pump comprises a cylindrical body and the shroud means is a single cylindrical sleeve.

9. The device of claim 1 wherein the attachment means comprises a metal strap attached to the shroud means and a bolt means to reduce the diameter of the strap to grip the apparatus.

10. The device of claim 1 wherein the diameter of the wheels is about 10 to about 75 percent larger than the height of the shroud means.

11. The device of claim 1 wherein the diameter of the wheels is about 20 to about 65 percent larger than the height of the shroud means.

12. The device of claim 1 wherein the lines of axis of rotation of the pair of the axles extend downwardly to intersect at point below the center of gravity of the shroud means.

13. The device of claim 1 wherein the combination of the diameter of the wheels, the length of the axles, and the angle upwardly of the axles place a combined center of gravity of the apparatus and the shroud means at a height below the line.

14. A pump transport device to facilitate movement of a submersible pump attached to a flexible hose, the movement being along the inside of a large diameter pipe having a lengthwise axis of symmetry, the device comprising:
    (a) a shroud means comprising a sleeve to interfit over the submersible pump, with a height, two opposite sides, and a center of gravity,
    (b) attachment means to detachably attach the submersible pump inside the sleeve,
    (c) two pairs of axles, each pair spaced apart toward opposite ends of the shroud means, and each axle of each pair having an axis of rotation angled upwardly on opposite sides of the sleeve, and
    (d) four wheels, one attached on each axle to rotate on the axis of rotation, the wheels being a diameter greater than the height of the shroud means,
    wherein the wheels on the same side of the shroud means rotate in single planes, and
    wherein the combination of the diameter of the wheels, the length of the axles, and the angle upwardly of the axles place the center of gravity of the shroud means at a height below a line drawn between points of intersection between the axes of rotation of a pair of the wheels and the planes of rotation of the wheels.

15. The device of claim 14 wherein wherein the wheels on the same side of the shroud means rotate in single planes intersecting at a level proximate the lengthwise axis of symmetry of the large diameter pipe.

16. The device of claim 15 wherein the single planes are sloped at angles within fifteen degrees of a radial direction of the large diameter pipe, from a contact point of the wheels against an inside wall of the large diameter pipe.

17. The device of claim 15 wherein the single planes are sloped at angles within ten degrees of a radial direction of the large diameter pipe, from a contact point of the wheels against an inside wall of the large diameter pipe.

18. The device of claim 14 wherein wherein the wheels on the same side of the sleeve rotate in single planes that proximate a radial direction of the large diameter pipe.

19. The device of claim 14 wherein the submersible pump comprises a cylindrical body and the shroud means is a single cylindrical sleeve.

20. The device of claim 14 wherein the pump comprises a cylindrical body housing a pump and a motor and the shroud means is a cylindrical sleeve of sufficient size to allow the cylindrical body to interfit into the sleeve with space remaining between the sleeve and the body.

21. The device of claim 14 wherein the attachment means comprises a metal strap attached to the shroud means and a bolt means to reduce the diameter of the strap to grip the submersible pump.

22. The device of claim 14 wherein the diameter of the wheels is about 10 to about 75 percent larger than the height of the shroud means.

23. The device of claim 14 wherein the diameter of the wheels is about 20 to about 65 percent larger than the height of the shroud means.

24. The device of claim 14 wherein the axis of rotation of a pair of the wheels extend downwardly to intersect at point below the center of gravity of the shroud means.

25. The device of claim 14 wherein the combination of the diameter of the wheels, the length of the axles, and the angle upwardly of the axles place a combined center of gravity of the submersible pump and the shroud means at a height below a line drawn between points of intersection between the axes of rotation of a pair of the wheels and the planes of rotation of the wheels.

26. A pump transport device to facilitate movement of a submersible pump attached to a flexible hose, the movement being along the inside of a large diameter pipe having a lengthwise axis of symmetry, the device comprising:

(a) a shroud means comprising a sleeve to interfit over the submersible pump, with a height, two opposite sides, and a center of gravity, (b) attachment means to detachably attach the submersible pump inside the sleeve, (c) two pairs of axles, each pair spaced apart toward opposite ends of the shroud means, and each axle of each pair having an axis of rotation and being attached and angled upwardly on opposite sides of the sleeve, and (d) four wheels, one attached on each axle to rotate on the axis of rotation, the wheels being a diameter greater than the height of the shroud means, wherein the wheels on the same side of the shroud means rotate in single planes intersecting at a level proximate the lengthwise axis of symmetry of the large diameter pipe, wherein the axis of rotation of a pair of the wheels extend downwardly to intersect at point below the center of gravity of the shroud means, and wherein the combination of the diameter of the wheels, the length of the axles, and the angle upwardly of the axles place the center of gravity of the shroud means at a height below a line drawn between points of intersection between the axes of rotation of a pair of the wheels and the planes of rotation of the wheels.

* * * * *